(12) United States Patent
Wrape

(10) Patent No.: US 7,530,194 B1
(45) Date of Patent: May 12, 2009

(54) ROTATING MOTORIZED FISH HOOK CREATING SOUND WAVES

(76) Inventor: Mark C. Wrape, 308 NE. Forest, #5, Lees Summit, MO (US) 64063

( * ) Notice: Subject to any disclaimer, the term of this patent is extended or adjusted under 35 U.S.C. 154(b) by 0 days.

(21) Appl. No.: 11/552,387

(22) Filed: Oct. 24, 2006

(51) Int. Cl.
*A01K 83/00* (2006.01)
*A01K 85/00* (2006.01)

(52) U.S. Cl. .................. 43/4.5; 43/42.31; 43/43.16; 43/26.1; 43/26.2

(58) Field of Classification Search ............... 43/43.16, 43/26.1, 26.2, 42.31, 17.1, 44.82, 4.5
See application file for complete search history.

(56) References Cited

U.S. PATENT DOCUMENTS

| 2,882,638 | A | * | 4/1959 | Moore | 43/26.1 |
| 3,789,534 | A | * | 2/1974 | Yankaitis | 43/19.2 |
| 5,237,771 | A | * | 8/1993 | Watson et al. | 43/42.31 |
| 5,890,315 | A | * | 4/1999 | Norton | 43/42.31 |
| 6,910,294 | B1 | * | 6/2005 | Talbert | 43/26.1 |

* cited by examiner

*Primary Examiner*—Kurt Rowan
(74) *Attorney, Agent, or Firm*—Joe D. Calhoun

(57) ABSTRACT

A fishing hook with a freely rotating electrical motor producing movement and sound waves.

10 Claims, 2 Drawing Sheets

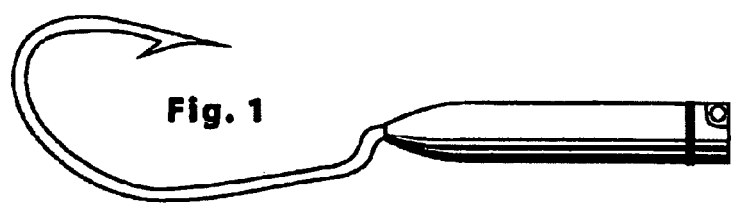
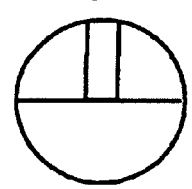
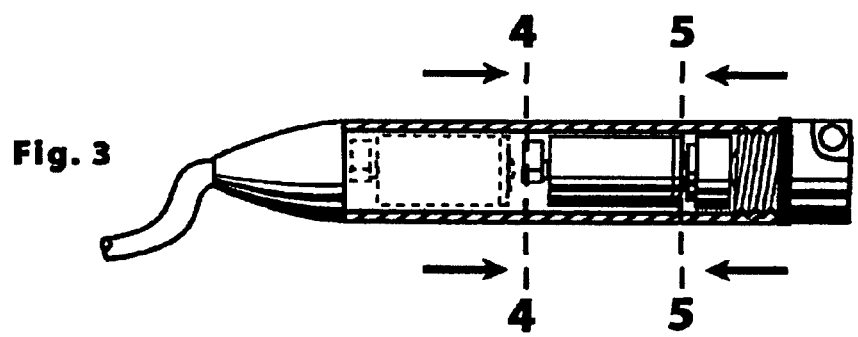
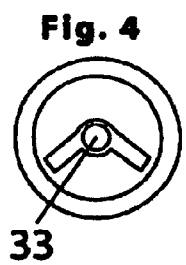
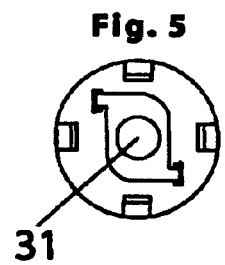
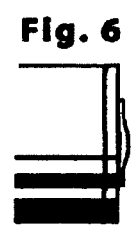
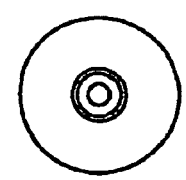
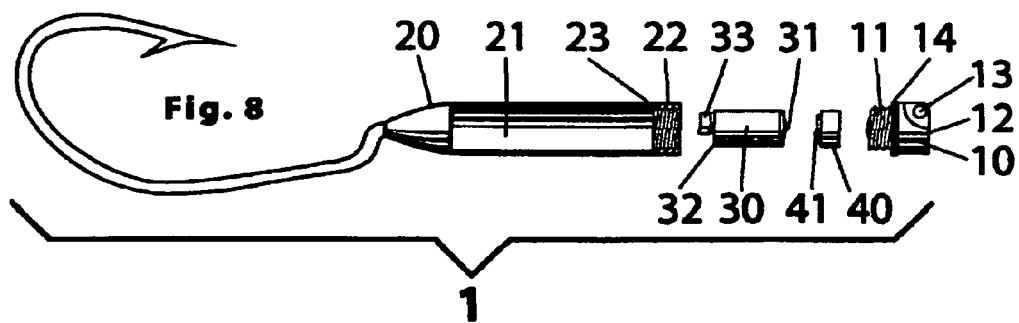

ROTATING MOTORIZED FISH HOOK CREATING SOUND WAVES

CROSS REFERENCE TO RELATED APPLICATIONS

This application is related to Provisional Patent Application No. 60/596,845 filed 25 Oct. 2005.

FEDERALLY SPONSORED RESEARCH AND DEVELOPMENT

Not applicable

MICROFICHE APPENDIX

Not applicable.

BACKGROUND OF THE INVENTION (1) Field of the Invention

This invention generally relates to fishing tackle. More particularly, this invention relates to the design of fishing hooks, and the fishing lures containing such fishing hooks. The present invention relates to a unique fishing hook that endows either the bait or the artificial lure accompanying it with both vibratory and rotational movement, as well as sound waves that are attractive to fish; such endowment may occur intermittently by changes in the tilting attitude of the device, under the control of the angler. The invented fishing hook does so without needing delicate switches to activate and deactivate the motor, and it is constructed to withstand the jarring and other forces commonly expected to be experienced by a fishing hook or lure.

The angler may simply position the motor and power source in the watertight hook casing, then cast the fishing hook into the water (adorned with live bait or other luring material); as the fishing hook descends (with its leading casing end tilted downward below the trailing end), gravity causes the miniature rotary-shaft motor within the hook casing to slide into contact with the power source, activating the motor and causing its rotary shaft to rotate the counterweight at its end. This causes the motor to rotate in the opposite direction, and to wobble slightly within the fishing hook casing; as a result, the descending fishing lure lists, wobbles and/or otherwise moves as if alive and well and/or injured; sound is also produced by the counterweight and the motor housing contacting the inner walls of the hook casing. Whenever the user pulls or "jigs" the fishing line, causing the lure to temporarily ascend with its leading casing end tilting toward the water surface, the motor within the hook casing slides out of contact with the power source, thereby deactivating the motor and the accompanying movement and sound.

This fishing hooked is designed to undulate with gyroscopic precession, under some circumstances producing an intermittent-pulsing, triple-axis rotational movement accompanied by a 3-dimensional sound wave, to attract fish. This is a significant improvement in design and performance for artificial or live bait presentation with a hook. The fishing hook can be used in a multitude of fishing applications encompassing the entire field of hook baiting and attraction techniques for the purpose of catching fish.

(2) Description of Related Art Including Disclosed 37 CFR 1.97 and 1.98.

Lures employing sound, vibratory movement or other motion to attract fish have been known in the angling field for several years. Known in the art are the following, arguably related to the patentability of the present invention:

| U.S. patent/App. | 1st Inventor | Date of Patent/Publication |
| --- | --- | --- |
| 2,552,730 | Miller | May 15, 1951 |
| 2,757,475 | Pankove | Aug. 7, 1956 |
| 2,909,863 | Rector | Oct. 27, 1959 |
| 3,310,902 | Godby | Mar. 28, 1967 |
| 3,841,0 2 | Maled | Oct. 15, 1974 |
| 4,223,467 | Hodges | Sep. 23, 1980 |
| 4,380,132 | Adkinson | Apr. 19, 1983 |
| 4,805,339 | Fuentes | Feb. 21, 1989 |
| 6,035,574 | Ware | Mar. 14, 2000 |
| 6,047,492 | Watson | Apr. 11, 2000 |
| 6,789,347 | West | Sep. 14, 2004 |
| 6,804,909 | West | Oct. 19, 2004 |
| 2004/0200125 | Albanito | Oct. 14, 2004 |

U.S. Pat. No. 2,552,730 issued to Miller provides a leaf spring which vibrates when the fishing line is given a sudden jerk. Since the spring vibrates in the water, however, the vibrations are of only short duration and thus effective only if a fish is in the immediate vicinity of the lure at the instant the spring is put in motion.

U.S. Pat. No. 2,909,863 issued to Rector et al. discloses a lure which produces a knocking or tapping sound, by means of a weight striking the walls of the hollow interior of the lure. The action of this lure depends upon movement of the lure through the water, and, consequently, results in an erratic tapping rather than uniform vibrations.

U.S. Pat. No. 2,757,475 issued to Pankove discloses a lure including a piezoelectric transducer powered by a transistorized oscillator circuit.

U.S. Pat. No. 3,310,902 issued to Godby discloses another similar lure of the plug design, which includes a vibrating coil and breaker point system which are energized by a battery and activated by a switch means operated by tension applied to the connecting line. Buzzing or vibrating of the internal coil and breaker point system is accomplished by pulling or jerking the line to slidably displace the switch with respect to the lure body, and thus complete the electrical circuit.

U.S. Pat. No. 3,841,012 issued to Maled discloses a plug-type lure having internal eccentric, vibrating or buzzing means for producing noise and lure vibration. This lure includes a hollow body which is caused to vibrate by a rotor, motor and battery combination located inside the body cavity. The battery is wired to the motor, and drives an eccentrically mounted weight on the motor output shaft, which weight rotates and strikes the inside cavity of the body to produce vibration, motion and sound.

U.S. Pat. No. 4,223,467 issued to Hodges, Jr. et al. discloses a vibrating fishing lure which includes a hollow body with a coil and breaker point vibrator combination mounted in the hollow interior of the body. The vibrator is activated by an attitude sensitive switch, and is powered by a battery. The battery is removably positioned in a cylindrically shaped carrier and sleeve located inside the hollow body, with access to the battery provided by a water tight threaded cap.

U.S. Pat. No. 4,380,132 issued to Atkinson discloses a fishing lure having a water-tight cavity with a wire spring within the cavity, one end of the spring being rigidly affixed to the lure body and the opposite end carrying a weight. The relationship between the cavity size and the weighted spring is such that the spring will oscillate freely within the cavity without the weight striking the cavity walls during normal movement of the lure through the water. Alternate forms of the invention utilize an electronic oscillator-driven transducer to produce vibration of the lure body.

U.S. Pat. No. 4,805,339 issued to Fuentes et al. discloses a sonic fishing lure having an energy source, an electrical circuit, and a sonic traducer, where each are respectively contained within chambers of a generally hollow cylindrically-shaped fishing lure. Due to the construction of the fishing lure, the sound output form the fishing lure is of a greater intensity and is produced for a longer period of time than that of prior art devices. The sound output from a coil activator vibrating-plate type of transducer is enhanced by the addition of a second vibrating plate. A fluid connection between the outer surface of the sound transducer and the body of the fishing lure further enhances and intensifies the sound output by the fishing lure.

U.S. Pat. No. 6,035,574 issued to Ware teaches a fishing lure for producing vibrations of a pre-determined frequency to attract fish. The fishing lure is provided with a streamlined body to substantially eliminate sound generating turbulence as the fishing lure is pulled through the water. The body is also provided with a shaft passing through the body to cause water passing through the shaft to generate vibrations of a pre-determined frequency known to attract fish. A hook is securely fastened to the body to reduce excess noise otherwise associated with the hook contacting the body.

U.S. Pat. No. 6,047,492 issued to Watson et al., discloses a fishing lure having a battery-powered oscillator circuit positioned within a water-resistant container module that is removably inserted into a selected body module. The module is balanced to insure proper lure action even as fish-attracting sounds and motions are generated from the container module.

None of the aforementioned patents discloses a rotary motor sliding and rotating freely within a fishing hook housing, or a V-shaped counterweight attached thereto, each of which intermittently produces both vibratory and rotational movement as well as sound waves without the need of a separate switch or microprocessor programming.

BRIEF SUMMARY OF THE INVENTION

In most general terms, the invention disclosed herein includes (comprises) a fishing hook comprising a hook means, a line attachment means, and an intermediate water-tight casing encasing a portable electrical power source and a rotary-shaft motor having an activation end slidably alignable with said power source, and including an opposite end comprising a rotary shaft and an unbalancing counterweight.

One primary object of the present invention is to provide an economical fishing hook that endows either the bait or the artificial lure accompanying it with both vibratory and rotational movement, as well as sound waves that are attractive to fish.

Another primary object of the present invention is to provide a fishing hook that is durable and easy to operate.

It is another object of the present invention to provide a fishing hook having a fishing line attachment eyelet that can accommodate a fishing line tied onto the front leading end of the eyelet for pulling or spin casting, or tied onto the top of the eyelet to facilitate pulling up and down with the fishing line as in jigging.

It is another object of the present invention to provide a fishing hook that can spread fish scent or attractant by its vibration and/or movement, for added attraction of fish.

Other objects will be apparent form a reading of the written description disclosed herein, together with the claims.

BRIEF DESCRIPTION OF THE SEVERAL VIEW OF THE DRAWINGS

FIG. 1 depicts a side elevation view of one single-hook embodiment of the invention.

FIG. 2 depicts a front elevation view of the casing of invention of FIG. 1.

FIG. 3 depicts a close-up side elevation view of part of the invention of FIG. 1, with a portion of the casing removed to expose the internal components.

FIG. 4 depicts a cross section view of the invention of FIG. 1, sectioned at plane 4-4 of FIG. 3 (but with the counterbalance rotated 180 degrees).

FIG. 5 depicts a cross section view of the motor of invention of FIG. 3, sectioned at plane 5-5 of FIG. 3.

FIG. 6 depicts a close-up side elevation view of the activating end portion of the motor of FIG. 3.

FIG. 7 depicts a rear elevation view the end cap of the invention of FIG. 3.

FIG 8 depicts an exploded view of the separate parts of the invention of FIG. 3.

Figure 9:
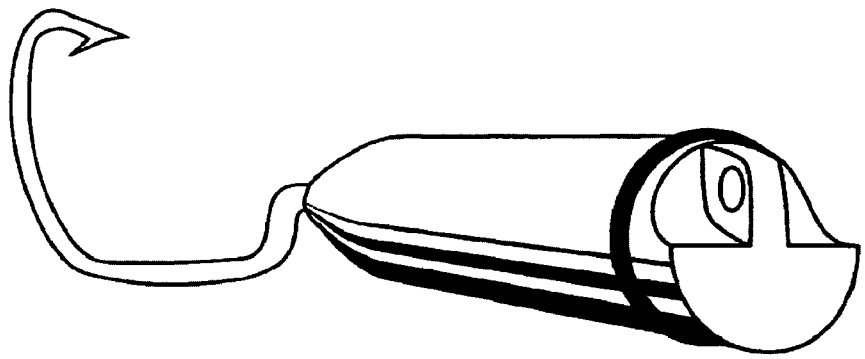
FIG. 9 depicts a perspective view of the invention of FIG. 1.
Figure 10:
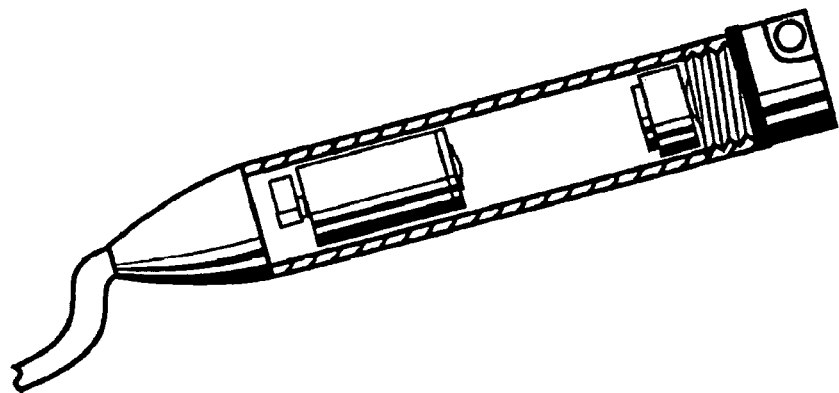
FIG. 10 depicts a close-up side elevation view of part of the invention of FIG. 1 oriented with its leading end upward, with a portion of the casing removed to expose the internal components.
Figure 11:
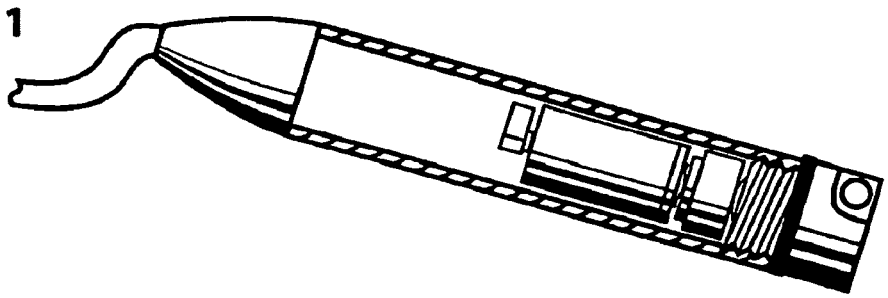
FIG. 11 depicts a close-up side elevation view of part of the invention of FIG. 1 oriented with its leading end downward, with a portion of the casing removed to expose the internal components.

FIGS. 1 through 11 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "list" or derivative thereof essentially means to tilt or sway, sometimes from side to side or partially so, especially without apparent pattern.

The term "micromotor" essentially means a motor having a length and width small enough to fit within the fishing hook casing with room to rotate and wobble slightly, such casing preferably being essentially a cylinder having an internal cavity diameter of 5/16 inch or less; one example of such a micromotor currently available of the market is the type of motor used in vibrating razors (such as made by Schick), or the type used in the micro or mini remote control cars.

The term "massing" or derivative thereof essentially means having sufficient mass to materially unbalance a micromotor when such mass is rotated on the rotary shaft of the micromotor.

The term "leading end" or derivative thereof essentially means the end nearer to the front end of the casing, usually where the fishing line attachment means is situated; for example, the leading end of the fishing hook casing will usually be nearer the fishing line attachment means such as an eyelet, while the leading end of a button cell battery will usually be the side opposite the activation side of the battery.

The term "trailing end" or derivative thereof essentially means the end further from the front end of the casing, for example, the trailing end of the fishing hook casing will usually be nearer a fishing hook staff protruding therefrom, the trailing end of a button cell battery will usually be the activation side of the battery, and the trailing end of an endcap will usually be the end having the external threads threadably insertable within the leading end of the cavity.

The term "attitude" or derivative thereof essentially means the amount of tilt (inclination or declination) of the fishing hook casing (and interior cavity); examples of the spectrum of attitudes include a fully vertical leading-end-up attitude, a partially vertical leading-end-up attitude, a horizontal attitude, a partially vertical leading-end-down attitude, and a fully vertical leading-end down attitude.

The term "luring material" or derivative thereof essentially means any material intended to be attractive to fish, or actually attractive to fish; for example, baiting the invented fishing hook with live bait (or chum or attractive scent) qualifies as luring material, as does inclusion of artificial material such as artificial bait as well as other materials commonly considered as part of fishing lures such as elements commonly used to make jigs, spinners, spoons, plastic baits, Carolina rigs, Texas rigs, and other types of lures.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although casing material essentially comprises aluminum, steel or brass, it may include any material capable of providing the necessary structural rigidity and water tightness needed to accomplish the functions of the casing. Such materials may include (for example) metals and alloys, polymers and plastics, and mixtures and combinations thereof. Casings can be made of a multitude of metal combinations for fresh or salt water use.

In most general terms, the disclosed invention relates to a gyroscopically undulating fishing hook device. It typically includes a cavinous shaft, water tight cap, button cell direct current battery, micromotor, V-shaped offset counterweight attached to the rotary shaft of the micromotor, and an essentially switchless configuration responsible for activating and deactivating the motor causing the hook's listing or rotational movement, and its sound wave production.

The weight of the hook casing (the leading end), greater than that of the staff-shaped hook (the trailing end), naturally causes the hook to sink leading end down. The motor is essentially unmounted within the casing cavity, free to slide or rotate within the casing cavity as dictated primarily gravity and the attitude of the cavity. Such construction is contrary to known fishing lures cited above; moreover, the motor of the present invention is activated and deactivated without any delicate switch or microprocessor programming.

In use, when the invented fishing hook is cast into the water (leading end down), the micromotor slides into contact with the battery, essentially acting as a micro mechanical motor-activation switch that is engaged and disengaged by the hook's attitude, angle or movement in the water, as the fishing hook sinks naturally, the casing's leading end (usually attached to the fishing line) tilts sufficiently below the trailing end (usually the free end of the fishing hook), causing the micromotor to slide into activating contact with the button cell battery. In that position, power from the battery activates the micromotor, causing rotation of the motor's rotary shaft, thereby applying torque to the counterweight attached to the end of the rotary shaft; rotation of the unbalanced counterweight within the casing also causes the micromotor to rotate in the opposite direction within the casing. As a result of the opposite rotations, the fishing hook is caused to list, wobble, or otherwise move as if alive and well or injured. Under some circumstances, the motor may cause the hook to list along different planes (such as the planes commonly known as the x axis, y axis and z axis), sometimes performing movement along one or more of the three axes.

The counterweight, preferably a unique split-V offset counterweight, is primarily responsible for the motor causing the hook to emulate a gyroscopic mode of precession. The counterweight is also partially responsible for the sound wave energy field production. The centrifugal characteristics of counterweight rotation causes opposite rotation of the motor within the casing, and causes sufficient destablization or imbalancing of the fishing hook to result in the desired amount of listing, wobbling or other movement of the invented fishing hook. The undulation is also affected by the user's attitude adjustments of the hook, usually accomplished by pulling or "jigging" the fishing line at the desired time(s); such attitude adjustment essentially controls the activation and deactivation of the motor, and the duration it produces.

This invention is unique and gives the fisherman a significant improvement in bait presentation, handling and attraction for a multitude of different styles of fishing. The fishing hook disclosed herein can be used in all live and dead bait applications or styles. The 90-degree flagging rotational motion produced by the gyroscopic activity of the motor and counterweight gives dead bait a life-like movement and appearance. This also provides a unique way of spreading fish attractants like blood, fish meal and fish chum. Included with this display is the production of an undulating 3-dimensional sound wave as an additional attractant. The device can be used with all types of jig combinations and appendices known in the field (not shown), including (but not limited to) spinners, spoons, buzz baits and rubber skirts. The invention can also be used with all types of artificial plastic or rubber bait combinations and appendices known in the field (not shown), including (but not limited to) worms, crayfish, minnows and frogs.

Depending on the fishing application or style, the user can alter the bait's presentational display and sound wave production by simple attitude adjustments of the hook. For example, when used as a jig, the fishing hook will vibrate as it sinks head-first. Then as it is raised or jigged upward (by tugging on the fishing line), the motor will fall away from the battery source and stop rotating. When used as a spinner bait, the more horizontal attitude of the hook will cause the motor to run slower because the motor's full weight is not being applied to the power source contact, thus reducing current flow and motor speed. Therefore, the speed and intensity of the gyroscopic motor movement is relative to the attitude of the lure.

The motor movement within the casing produces kinetic energy, by its seemingly-floating free rotation; such kinetic energy emulates life energy. Smaller or larger micromotors can be used as well, for many different hook sizes or amount of movement desired, depending on the desired fishing application or style needed. Sound waves are produced by both the motor and the counterweight striking the side of the casing, the high-rpm rotation of the counterweighs produces one set of sound vibrations, while the slower rotation of the motor produces another set of sound vibrations. The sound waves produced are in both the audible and inaudible frequencies.

The amount of clearance between the motor housing and the casing cavity also facilitates a certain amount of listing, wobbling or other movement, helping endow the invented fishing hook with a toggling mode of precession. Fishing hooks having different combinations of cavity size and motor size may be used to change the characteristics of the vibration, movement and sound of the device.

One general version of the invention includes a fishing hook including a hook means, a line attachment means, and an intermediate watertight casing. The casing encases an electrical power source and a rotary-shaft motor having an activation end slidably alignable with the power source, and having an opposite end including a rotary shaft and an unbalancing counterweight.

Another version of the invention includes a casing defining an essentially cylindrical cavity; the motor includes a micromotor including an essentially cylindrical housing slidably receivable within the cavity. The power source includes a button cell battery; examples of such batteries include small disk-like batteries commonly use in watches, such as the 1.5 volt silver oxide battery currently produced by Energizer as item number 377/376. Such batteries include an activating side having a cylindrical circumference spanning the cavity; sufficient tilting of the cylindrical cavity from the leading-end-up orientation toward the leading-end-down orientation allows the micromotor activation end to slide into activating contact with the battery.

Another version of the invention includes the counterweight comprising unbalancing configuration selected from the group consisting of V-shaped arms, V-shaped arms with terminal massing, and any other configuration whose centrifugal properties unbalance said fishing hook when in use. More particularly, the invention disclosed herein preferably includes the counterweight having V-shaped arms.

Another version of the invention includes the watertight casing comprising a cylindrical cavity having an internally threaded leading end and, trailing the threading, a cylindrical battery ledge around the circumference of the cavity. The ledge provides a seat preventing the battery from moving further into the cavity toward the unmounted motor; the properly positioned battery has its circumference seated along that ledge, with the inner portion of its trailing side exposed to accept contact by the activation end of the motor. A cylindrical endcap (having an externally threaded trailing end) is screwed into the internally threaded leading end of the cavity, to essentially press the battery upon its ledge, thereby affixing said battery therein and facilitating a positive electrical field along said casing, and to close the cavity for water tightness; for additional water tightness, the endcap may include a circumferential groove between the threading and the cap, for accepting a gasket (made of rubber, silicon or other waterproof material). The endcap also has a leading end including a line-attachment eyelet on the exterior surface of the cap. The eyelet may be positioned and/or configured to facilitate tying the fishing line securely to the front (leading end) of the eyelet to facilitate pulling or spin casting, or tying the fishing line securely to the side of the eyelet closer to the circumferential plane of the casing for pulling the fishing hook upward or downward as in jigging.

Another version of the invention includes the hook means selected from the group consisting of single barbed hooks, and multi-hook arrangements known in the field (not shown) such as pairs of barbed hooks, treble barbed hooks or any plurality of barbed hooks, or combinations and mixtures thereof. Another version of the invention further includes hook means used as a component in lures known in the field (not shown), such as artificial bait, jigs, spinners, spoons, buzz baits, rubber skirts, appendices, or combinations and mixtures thereof.

A detailed embodiment of the invention includes:
(a) a barbed hook means;
(b) a cylindrical endcap (10) having an externally threaded trailing end (11), a leading end (12) including a line-attachment eyelet (13), and an intermediate gasket (14);
(c) an intermediate watertight casing (20) defining a cylindrical cavity (21) having an internally threaded leading end (22) and a cylindrical battery ledge (23) around the circumference of the cavity;
(d) a rotary-shaft micromotor (30) including a cylindrical housing and having an activation end (31) slidably alignable with a button cell battery and an opposite end including a rotary shaft (32) and a V-shaped counterweight (33); and
(e) a button cell battery (40) including an activating side (41) having a cylindrical circumference spanning the cavity on the leading side of the ledge, whereas sufficient tilting of the cylindrical cavity from the leading-end-up orientation toward the leading-end-down orientation allows the micromotor activation end to slide into activating contact with the battery.

Besides the above fishing hooks, the invention disclosed herein includes a method of using a fishing hook described above, including the steps of:
inserting the micromotor into the cavity, counterweight end first and with the activation end toward the leading end of the cavity;
inserting the button cell battery into the cavity and spanning the ledge, with its activation side toward the activation end of the micromotor; and
screwing the endcap onto the leading end of the casing, to a watertight tightness.

Additionally, the invention includes a method of using a fishing hook described above, including the further steps of:
attaching a fishing line to the eyelet on the endcap;
adding any desired bait and/or luring material to the fishing hook; and
casting the fishing hook into water.

Those skilled in the art who have the benefit of the this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

I claim:
1. A fishing hook comprising a hook means, a line attachment means, and an intermediate watertight casing encasing a fixed electrical power source and a free-sliding motor having an activation end slidably alignable with said power source and an opposite end comprising a rotary shaft and an unbalancing counterweight, the casing defining an essentially cylindrical cavity, the motor comprising a micromotor including an essentially cylindrical housing slidably receivable within the cavity, the power source comprising a button cell battery including a trailing activating side having a cylindrical circumference spanning the cavity, whereas sufficient tilting of the cylindrical cavity from the leading-end-up orientation toward the leading-end-down allows the micromotor activating end to slide into activating contact with the trailing activating side of said battery, the activation of said motor causing rotation of said shaft and counterweight and endowing the fishing hook with rotational force, said counterweight rotation also causing said motor to engage in counter-rotation within said casing and endow the fishing hook with counter-rotational force enabling the fishing hook to shun contact from its external environment, said counter-rotation also causing said motor and said counterweight to contact said casing and further endow the fishing hook with differing contact sounds.

2. A fishing hook described in claim 1 above, the counterweight comprising unbalancing configuration selected from the group consisting of V-shaped arms, and V-shaped arms with terminal massing.

3. A fishing hook described in claim 1 above, the counterweight comprising V-shaped arms.

4. A fishing hook described in claim 2 above, the watertight casing comprising a metal cylinder with a cylindrical cavity having an internally threaded leading end and a cylindrical battery ledge around the circumference of the cavity for supporting the circumference of the trailing activating side of the battery, and a cylindrical metal endcap having an externally threaded trailing end, said endcap screwing into said leading end of the casing and into contact with a leading side of said battery, thereby affixing said battery therein, the watertight casing further comprising a leading end including a line-attachment eyelet, and an intermediate gasket.

5. A fishing hook described in claim 2 above, the hook means used in known hook arrangement selected from the group consisting of single barbed hooks, pairs of barbed hooks, treble barbed hooks or any plurality of barbed hooks.

6. A fishing hook described in claim 5 above, used as a component in other known lures selected from the group consisting of artificial bait, jigs, spinners, spoons, buzz baits, rubber skirts, or appendices.

7. A fishing hook comprising:
(a) a barbed hook means;
(b) a cylindrical metal endcap having an externally threaded trailing end, a leading end including a line-attachment eyelet, and an intermediate gasket;
(c) an intermediate watertight metal casing defining a cylindrical cavity having an internally threaded leading end and a cylindrical battery ledge around the circumference of the cavity;
(d) a rotary-shaft micromotor including a cylindrical housing and having an activation end slidably alignable with a button cell battery and an opposite end comprising a rotary shaft and a V-shaped counterweight; and
(e) a button cell battery including a leading side and an activating side having a cylindrical circumference spanning the cavity on the leading side of the ledge, said endcap screwing into said leading end of the casing and into contact said leading side of said battery, thereby affixing said battery therein, whereas sufficient tilting of the cylindrical cavity from the leading-end-up orientation toward the leading-end-down orientation allows the micromotor activation end to slide into activating contact with the battery, the activation of said micromotor causing rotation of said shaft and counterweight and endowing the fishing hook with rotational force, said counterweight rotation also causing said motor to engage in counter-rotation within said casing and endow the fishing hook with counter-rotational force enabling the fishing hook to shun contact from its external environment, said counter-rotation also causing said motor and said counterweight to contact said casing and further endow the fishing hook with differing contact sounds.

8. A method of using a fishing hook described in claim 7 above, comprising the steps of:
(a) inserting the micromotor into the cavity, counterweight end first and with the activation end toward the leading end of the cavity;
(b) inserting the button cell battery into the cavity and spanning the ledge, with its activating side toward the activation end of the micromotor;
(c) screwing the endcap onto the leading end of the casing and into contact with the leading side of the button cell battery, to a watertight tightness; and
(d) orienting the fishing hook in a leading-end-up position to assure deactivation of the micromotor for conservation of battery power.

9. A method of using a fishing hook described in claim 8 above, comprising the further steps of:
(a) attaching a fishing line to the eyelet on the endcap;
(b) adding any desired bait and/or luring material to the fishing hook; and
(c) casting the fishing hook into water.

10. A method of using a fishing hook described in clam 9 above, comprising the further steps of, whenever the user desires the fishing hook to cease producing sound and contact-shunning reaction, adjusting the fishing line sufficient to cause the leading end of the fishing hook to orient above the trailing end and deactivate the micromotor.

\* \* \* \* \*